No. 887,212. PATENTED MAY 12, 1908.
O. A. MOLDENHAUER.
COW MILKER.
APPLICATION FILED JAN. 28, 1907.
2 SHEETS—SHEET 1.
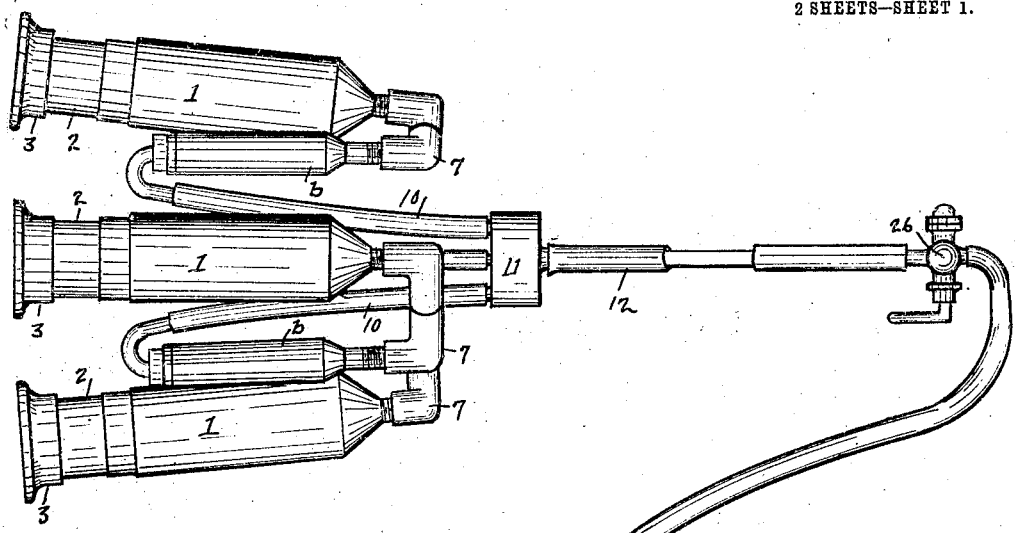
Fig. 1.
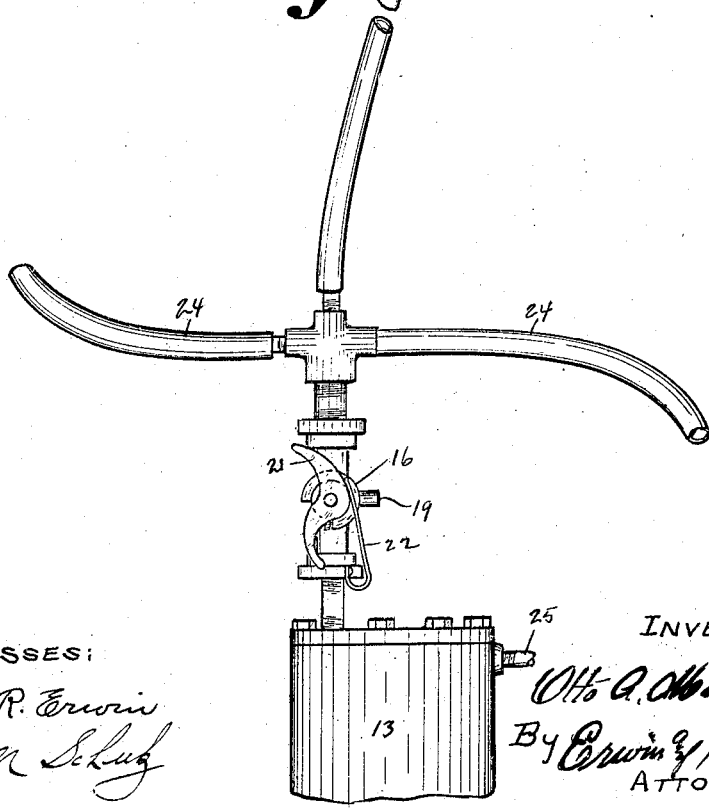
WITNESSES:
O. R. Erwin
M. M. Schulz
INVENTOR
Otto A. Moldenhauer
By Erwin & Wheeler
ATTORNEYS.

No. 887,212. PATENTED MAY 12, 1908.
O. A. MOLDENHAUER.
COW MILKER.
APPLICATION FILED JAN. 28, 1907.
2 SHEETS—SHEET 2.
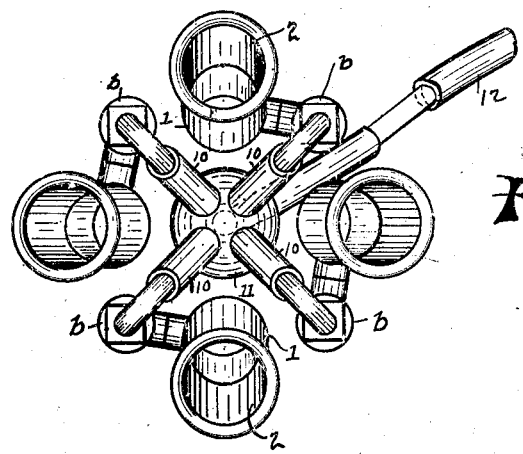
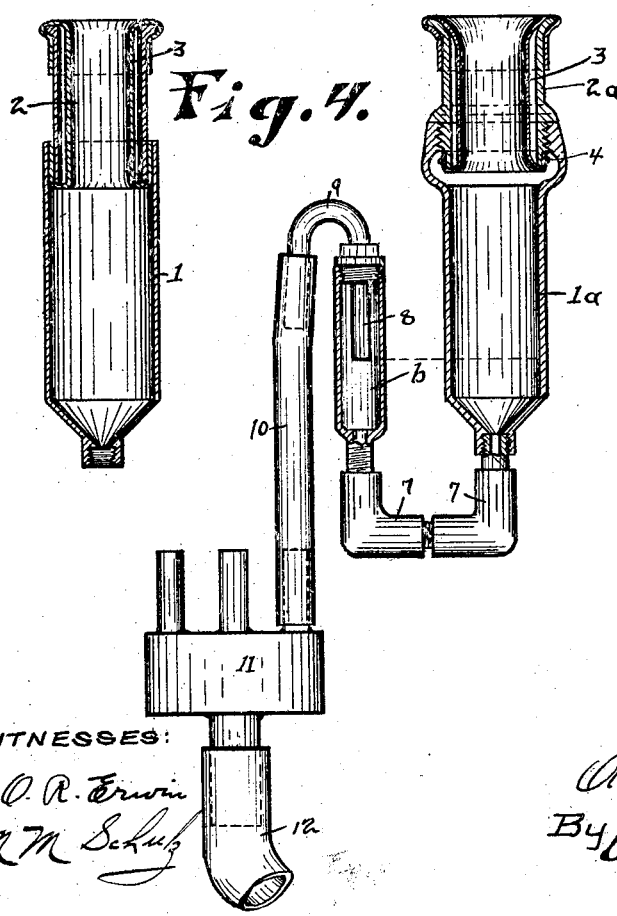
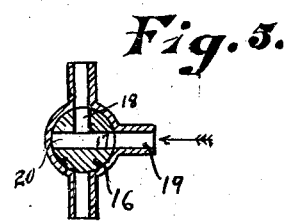
WITNESSES:
INVENTOR
ATTORNEYS.

UNITED STATES PATENT OFFICE.

OTTO A. MOLDENHAUER, OF WATERTOWN, WISCONSIN.

COW-MILKER.

No. 887,212.

Specification of Letters Patent.

Patented May 12, 1908.

Application filed January 28, 1907. Serial No. 354,425.

*To all whom it may concern:*

Be it known that I, OTTO A. MOLDENHAUER, a citizen of the United States, residing at Watertown, county of Jefferson, and State of Wisconsin, have invented new and useful Improvements in Cow-Milkers, of which the following is a specification.

My invention relates to improvements in milking machines of that class which operate by suction.

The object of this invention is to provide means for alternately withdrawing air from and admitting it to a teat inclosing suction cup, in a manner to not only relieve the teat from a continuous suction strain but to moisten it and draw the milk therefrom in a natural manner. Also to provide means, controlled through the application of the suction, for lightly compressing the upper portion of the teat, regard being had for thorough sanitation as well as for lightness and simplicity.

A further object is to provide means for maintaining a supply of milk in the suction cups in case the suction is continued after the supply in the udder has been exhausted, whereby the direct strain and injurious effect of a dry suction is avoided. Also to provide a mixing or settling chamber wherein the milk is aerated and permitted to condense.

In the following description, reference is had to the accompanying drawings in which, Figure 1 is a general view of my invention showing the same connected with a suitable receiver. Fig. 2 is a top view of a set of suction cups. Fig. 3 is a detail view partly in section, of one of the cups and its connections, with the mixing chamber included, a modified form of cup being illustrated. Fig. 4 is a detail sectional view of one of the cups of the style shown in Fig. 1. Fig. 5 is a sectional view of the three way valve.

Like parts are identified by the same reference characters throughout the several views.

The teat cups are formed in sections 1 and 2 and are provided near their upper ends with a flexible rubber lining member 3. In the construction shown in Fig. 4, this consists of a thin piece of rubber tubing extending through the upper section 2 of the cup, to the upper end of which it is rigidly secured. The lower end of the lining is folded over the lower end of the section 2 and bound between it and the wall of the lower section or member 1, into which the upper section (with the lining folded over its lower edge) is adapted to fit.

In Fig. 3, the sections 1ª and 2ª are screwed together. The lining 3 is folded over the ends of the upper section and secured thereto by wire 4. Any other suitable means for securing the lining in position may be employed.

It will be observed that the lining 3 does not cover the lower portion of the cup. It is therefore adapted to bear only against the upper portion of the teat, leaving the lower portion without constriction. When the suction is applied, the air pressure back of the lining 3 pushes it inwardly and applies the desired pressure to the upper portion of the teat to force the milk downwardly. The lining is of less diameter than the cup section so that, when the ends are drawn outwardly or expanded over the ends of the section 2, it is not only distended, but pockets a body of air between its central portion and the wall of section 2. As hereinafter explained, air is alternately withdrawn and admitted to the cup and the permanently confined air between the lining and the wall of section 2, causes the lining to pulsate in contact with the upper portion of the teat without applying a heavy pressure thereto, and this has been found very effective in withdrawing the milk.

The lower ends of the suction cups are connected with a trap chamber $b$ by elbowed tubular connections 7, and a tube 8 leads downwardly into the trap chamber to an inlet at 9 and downwardly on the exterior through a flexible tube 10, to a chamber 11, which serves as a collecting, settling and aerating chamber, and from which a flexible main 12 extends and connects with a receiver 13. It will be observed that an inlet 9 is located above the level of the bottom of the corresponding cup. The pipe 8 will therefore draw milk directly from the cup when the level of the milk therein is above the inlet, but otherwise will leave enough milk in the cup to prevent the direct application of the suction, and to keep the teat moist until the milking operation ceases.

All the tubes 8 and 10 of a set, discharge into the chamber 11, from which the milk passes into the main 12. Near the receiver, this is provided with a three way valve 16 having ports 17 and 18, which normally connect the open air duct 19 with the main, but which also has a port 20, adapted, with the port 17, to connect the main with the receiver. A valve actuating lever 21 is held in normal position by a spring 22 and is pushed against the tension of the spring to open the ports 18 and 20. 24 are branch mains to which other sets of suction cups may be connected whereby several cows may be milked at once. 25 is a suction pipe leading from the receiver and to which an exhaust pump (not shown) may be applied to secure the necessary suction.

In operation the suction pumps being in position, and a vacuum being maintained in the receiver by the exhaust pump, the lever 21 is oscillated to alternately connect the main with the receiver, suction is of course applied to the cups, and the lining members 3 push inwardly and coöperate in expelling the milk. When connected with the exterior, air enters the main and passing to the chamber 11 aerates the milk therein and also facilitates condensation. The milk reaches this chamber in a foaming condition, but on contact with the air and the walls of the chamber, much of it condenses and it will therefore not fill the receiver with foam to be drawn off through the pipe 25 to the pump. With each turn of the lever the milk in the connected cups will be drawn down to the level of the inlet 9 and with the reverse turn will rush upwardly in the cup upon the access of air to the system. A valve 26 is used to cut off the unused sets of cups.

Having thus described my invention what I claim as new and desire to secure by Letters Patent is,

1. In a milking machine, a suction cup comprising an inflexible cylinder and a flexible lining of less diameter at the upper end of the cylinder, having its end portions expanded and secured to the cylinder walls and forming with such walls a closed air space between the central portions of the lining and the walls.

2. In a milking machine, a suction cup comprising an inflexible cylinder and a flexible lining of less diameter at the upper end of the cylinder, having its end portions expanded and secured to the cylinder walls and forming with such walls a closed air space between the central portions of the lining and the walls, together with means for alternately withdrawing and admitting air to the teat receiving portion of the cup.

3. In a milking machine, a suction cup comprising a cylinder formed in telescoping sections, a flexible lining having its end portions expanded and folded over the ends of the upper section, both said lining and the wall of the section being imperforate and arranged to inclose a body of confined air between them.

4. In a milking machine, the combination of a suction cup, a milk receiver, a main connecting the suction cup with the receiver, valve mechanism adapted to place the main alternately in communication with the receiver and with the open air, together with a closed air chamber encircling the upper portion of the cup and provided with a flexible inner wall.

5. In a milking machine, the combination of a suction cup provided with an annular air chamber at its upper end containing a body of confined air and having an elastic inner wall secured under tension to the other walls of the chamber, a main leading from the lower portion of the cup, a milk receiver connected with the main, and means for placing the teat receiving portion of the cup alternately in communication with the receiver and with the open air.

6. In a milking machine, a suction cup having a trap connection comprising a chamber located above the bottom of the cup, and a suction tube connected with its upper end portion.

7. In a milking machine, a suction cup having a trap connection comprising a chamber located above the bottom of the cup, and a suction tube connected with its upper end portion and extended downwardly therein with an inlet at an intermediate point.

8. In a milking machine, a teat cup formed in sections and having a telescopic upper section, a tubular flexible lining for said upper section, expanded outwardly and folded over the ends of said section, and engaged between the lower end portion of said upper section and the upper portion of the lower section.

9. In a milking machine, a set of suction cups all connected with a common settling chamber, a receiver and a main leading from the settling chamber to the receiver together with a trap interposed between each suction cup and the settling chamber.

10. In a milking machine, a set of suction cups all connected with a common settling chamber, a milk receiver and a main leading from the settling chamber to the receiver, together with means for placing the main alternately in communication with the receiver and with the open air.

11. In a milking machine, a suction cup, a milk receiver, a connecting main, and means for placing the main in alternate communication with the receiver and with the open air, together with an intermediate settling chamber communicating with the cup and with said main.

12. In a milking machine, a suction cup, a milk receiver, a connecting main, and means for placing the main in alternate communication with the receiver and with the open air, said means comprising a three way valve and an actuating lever therefor, provided with a spring adapted to hold the valve normally in receiver closing position.

In testimony whereof I affix my signature in the presence of two witnesses.

OTTO A. MOLDENHAUER.

Witnesses:
   FERDINAND BEHL,
   LEVERETT C. WHEELER.